(12) United States Patent
Senagore et al.

(10) Patent No.: US 7,931,471 B2
(45) Date of Patent: Apr. 26, 2011

(54) SURGICAL TRAINING AID APPARATUS

(76) Inventors: Anthony Senagore, Grand Rapids, MI (US); Warren M. Zimmerman, Grand Haven, MI (US)

( * ) Notice: Subject to any disclaimer, the term of this patent is extended or adjusted under 35 U.S.C. 154(b) by 612 days.

(21) Appl. No.: 11/805,724

(22) Filed: May 24, 2007

(65) Prior Publication Data

US 2008/0293026 A1 Nov. 27, 2008

(51) Int. Cl.
*G09B 23/28* (2006.01)
(52) U.S. Cl. ...................................................... 434/267
(58) Field of Classification Search .................. 434/262, 434/267, 268, 269, 272, 274
See application file for complete search history.

(56) References Cited

U.S. PATENT DOCUMENTS

| | | | | |
|---|---|---|---|---|
| 3,339,290 A | * | 9/1967 | Doyle | 434/267 |
| 4,481,001 A | * | 11/1984 | Graham et al. | 434/267 |
| 4,867,686 A | * | 9/1989 | Goldstein | 434/267 |
| 5,149,270 A | * | 9/1992 | McKeown | 434/262 |
| 5,620,326 A | | 4/1997 | Younker | |
| 5,722,836 A | | 3/1998 | Younker | |
| 5,850,033 A | * | 12/1998 | Mirzeabasov et al. | 73/12.01 |
| 5,947,743 A | * | 9/1999 | Hasson | 434/262 |
| 5,951,301 A | | 9/1999 | Younker | |
| 6,336,812 B1 | * | 1/2002 | Cooper et al. | 434/267 |
| 6,997,719 B2 | * | 2/2006 | Wellman et al. | 434/272 |
| 7,419,376 B2 | * | 9/2008 | Sarvazyan et al. | 434/273 |
| 7,507,092 B2 | * | 3/2009 | Sakezles | 434/267 |
| 7,575,434 B2 | * | 8/2009 | Palakodeti | 434/267 |
| 2004/0033476 A1 | * | 2/2004 | Shun | 434/262 |

* cited by examiner

*Primary Examiner* — Kurt Fernstrom
(74) *Attorney, Agent, or Firm* — The Watson I.P. Group, PLC; Jovan N. Jovanovic; Vladan M. Vasiljevic

(57) ABSTRACT

A surgical training aid apparatus for facilitating the training of medical procedures comprising a housing and an anatomical replicating assembly. The housing includes a tray having a bottom surface and a top surface opposite the bottom surface. The anatomical replicating assembly is positioned upon the top surface of the tray of the housing, and includes a base layer and at least one body component. The base layer has a bottom surface and a top surface, and, overlays a portion of the top surface of the tray of the housing. The base layer further includes a tackiness. The body component is positioned between the top surface of the housing and the bottom surface of the base layer or on the base layer. The body component likewise includes a tackiness. The body component is releasably coupled to the base layer due to the tackiness of the two components, wherein the tackiness is overcome so as to separate the at least one body component relative to the base layer.

19 Claims, 11 Drawing Sheets

SURGICAL TRAINING AID APPARATUS

BACKGROUND OF THE INVENTION

1. Field of the Invention

The invention relates in general to training aids, and more particularly, to a training aid for the medical field, wherein the training aid facilitates the teaching and practicing of various medical procedures.

2. Background Art

The use of practice aids or teaching aids in the medical field has been quite extensive. For example, rigid models of the body have been used as demonstration aids to teach both anatomy and procedures to students and practitioners. Such models may show anatomical relationships of organs but not the characteristics of normal and pathologic tissue planes that separate organs. These key fact limits the usefulness of current models to teach complex surgical skills.

Typically, for practicing many medical procedures, and especially for practicing soft tissue procedures, it is quite common to use human cadavers. One problem with such an approach is that human cadavers vary relative to health, age, size, and alteration of normal anatomy by prior surgery or disease. Moreover, a human cadaver allows for the performing of a particular procedure only once and at great expense. Finally, current laparoscopic training requires fresh, unembalmed human cadavers which greatly increases the potential for disease transmission to trainees and mentors. A great need exists for alternatives that can provide the required realism at a significant cost and risk savings over a human cadaver.

Certain aids have been developed to address the need for practice while overcoming the costs associated with the use of human cadavers. One such example is U.S. Pat. No. 5,951, 301 issued to Younker and assigned to Simulab Corporation of Seattle, Wash. Typically, the commercial embodiments include a rigid structure having a plurality of body components that are placed on the rigid structure. While such an aid provides certain training of medical procedures, certain deficiencies have been recognized. First, while body components are typically present, these body components are not realistically positioned relative to the other portions of the body, and in particular, the connection of the components to particular layers associated with the body, namely, the fusion plane between peritoneal layers and Toldt's Fascia (i.e., s specialized connective tissue layer which separates the retro-peritoneal structures (muscles, bones, vascular structures, and ureters) from the intraperitoneal organs. Further, the interaction between the layers themselves and between the structures in the various layers are not contemplated, representing an essential missing element for effective surgical training.

As such, while procedures can be discussed, the device lacks the necessary realism and realistic body component placement, such that there is no material representation of the interaction of the body components within the various layers of the body. This is especially significant with the practicing of laparoscopic procedures. For example, the prior art teaching aids are quite limited in providing realistic simulation of the procedures shown in, for example Delaney, et al, "Operative Techniques in Laparoscopic Colorectal Surgery," wherein the text is incorporated herein by reference in its entirety. The text is based upon the learning of the planes of dissection, and the mastering of procedures which occur between the planes of dissection or within certain planes. To provide the necessary training and simulation, the identification of layers and the connection or attachment of body components to the various layers of the body must be provided.

It is an object of the present invention to provide a surgical training aid apparatus which provides enhanced realism relative to procedures of the prior art.

It is another object of the present invention to provide a surgical training aid apparatus which includes the various layers (i.e., fascia, toldt's fascia, peritoneum, etc.) which form the various dissection planes and the interaction between the various dissection planes and the various body components.

It is another object of the invention to provide a surgical training aid apparatus which provides increased realism for facilitating training of laparoscopic procedures.

These objects as well as other objects of the present invention will become apparent in light of the present specification, claims, and drawings.

SUMMARY OF THE INVENTION

In a first aspect, the invention is directed to a surgical training aid apparatus for facilitating the training of medical procedures comprising a housing and an anatomical replicating assembly. The housing includes a tray having a bottom surface and a top surface opposite the bottom surface. The anatomical replicating assembly is positioned upon the top surface of the tray of the housing, and includes a base layer and at least one body component. The base layer has a bottom surface and a top surface, and, overlays a portion of the top surface of the tray of the housing. The base layer further includes a tackiness. The body component is positioned between the top surface of the housing and the bottom surface of the base layer or on the base layer. The body component likewise includes a tackiness. The body component is releasably coupled to the base layer due to the tackiness of the two components, wherein the tackiness is overcome so as to separate the at least one body component relative to the base layer.

In one embodiment, the apparatus further comprises at least one upper layer. The upper layer has a bottom surface and a top surface. The upper layer coextensive with at least a portion of the base layer. Additionally, the at least one upper layer includes a tackiness. The body component further includes a further body component which is positioned between the base layer and the at least one upper layer. The further body component includes a tackiness.

In one embodiment, the at least one upper layer further comprises a plurality of upper layers. The further body component is positioned at least one of between the first upper layer and second upper layer and on the second upper layer.

In another such embodiment, the base layer replicates a fascia, at least one of the plurality of upper layers comprises a toldt's fascia and at least one of the plurality of upper layers comprises a peritoneum.

In another preferred embodiment, the at least one body component comprises a plurality of body components. In particular, the plurality of body components comprise a colon with rectum positioned upon the second upper layer, a sigmoid vessel assembly and a right colic vessel assembly positioned between the first upper layer and the second upper layer, at least one ureters positioned between the base layer and the first upper layer, and at least one artery and at least one vein positioned between the upper surface of the tray and the base layer.

In another embodiment, the tackiness of the base layer and the at least one body component comprises the natural tackiness of the material.

In another embodiment, the base layer and the at least one body component comprise a urethane material.

In yet another embodiment, the tackiness of the base layer and the at least one body component are of a different strength.

Preferably, at least one of the at least one components is adhered to at least one of the tray and the base layer. For example, the colon may be adhered to the second upper layer, replicating the peritoneum.

In yet another embodiment, the top surface of the tray includes contours to replicate at least one body component.

In another aspect of the invention, the apparatus comprises a base, a plurality of layers defining a plurality of dissection planes, and at least one body component. The body component is positioned either between or on one of the plurality of layers defining a plurality of dissection planes. At least one of the plurality of layers and the at least one body component includes a tackiness which releasably attaches the at least one body component and at least one of the plurality of layers together.

In one embodiment, the base includes a tray having a top surface which includes a tackiness.

In yet another aspect of the invention, the invention comprises a method of surgical training comprising the steps of: cutting at least a portion of a first layer defining a plane of dissection; exposing at least one of a second layer and a body component, at least one of the second layer and the body component being releasably attached to the first layer; and separating at least one of the second layer and the body component from the first layer.

BRIEF DESCRIPTION OF THE DRAWINGS

The invention will now be described with reference to the drawings wherein:

FIG. 5 of the drawings is a top plan view of one embodiment of the surgical training aid apparatus of the present invention, showing, in particular, the positioning of the base layer;

FIG. 6 of the drawings is a top plan view of one embodiment of the surgical training aid apparatus of the present invention, showing, in particular, the positioning of body components upon the base layer;

FIG. 7 of the drawings is a top plan view of one embodiment of the surgical training aid apparatus of the present invention, showing, in particular, the positioning of an upper layer;

FIG. 8 of the drawings is a top plan view of one embodiment of the surgical training aid apparatus of the present invention, showing, in particular, the positioning of body components upon the upper layer;

DETAILED DESCRIPTION OF THE INVENTION

Figure 1:
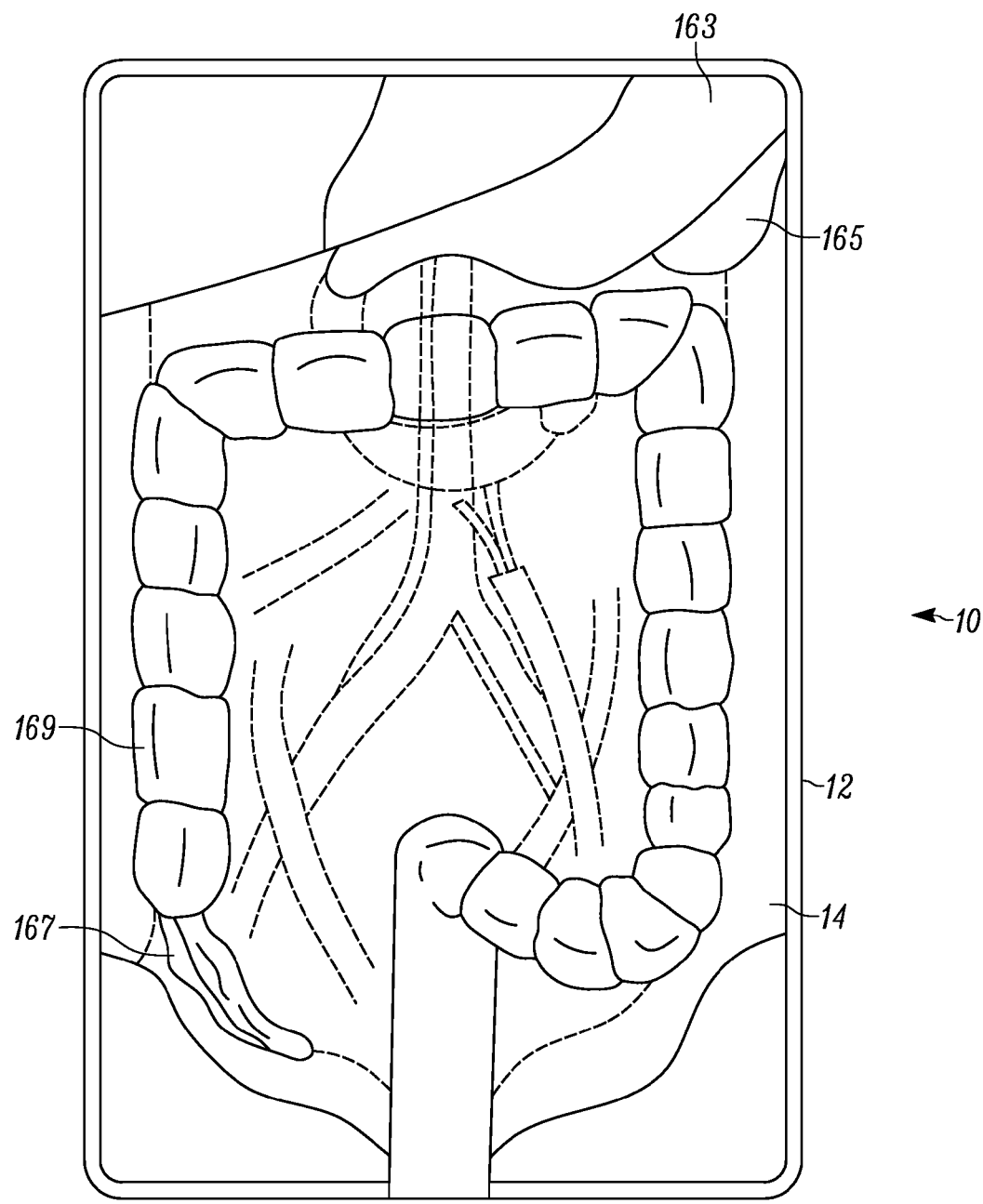
FIG. 1 of the drawings is a top plan view of one embodiment of the surgical training aid apparatus, showing, in particular, a realistic representation of the abdominal portion of a human body, which demonstrates the various layers of the human body.

While this invention is susceptible of embodiment in many different forms, there is shown in the drawings and described herein in detail a specific embodiment with the understanding that the present disclosure is to be considered as an exemplification of the principles of the invention and is not intended to limit the invention to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, a surgical training aid apparatus of the present invention is shown generally at 10. Apparatus 10 includes housing 12, and anatomical replicating assembly 14. Typically, the surgical training aid is used to teach and/or train doctors the proper steps and procedure for any number of different operations and medical procedures. One particular advantage of the system is that it facilitates the teaching and training of laparoscopic procedures. In particular, the system facilitates the teaching of the different planes (layers) of dissection in the body and the conducting of a medical procedure within the context of the different planes/layers of dissection. Moreover, the various body components and layers include a tackiness such that they selectively adhere to each other in a predetermined manner, to more realistically simulate the human anatomy.

Figure 2:
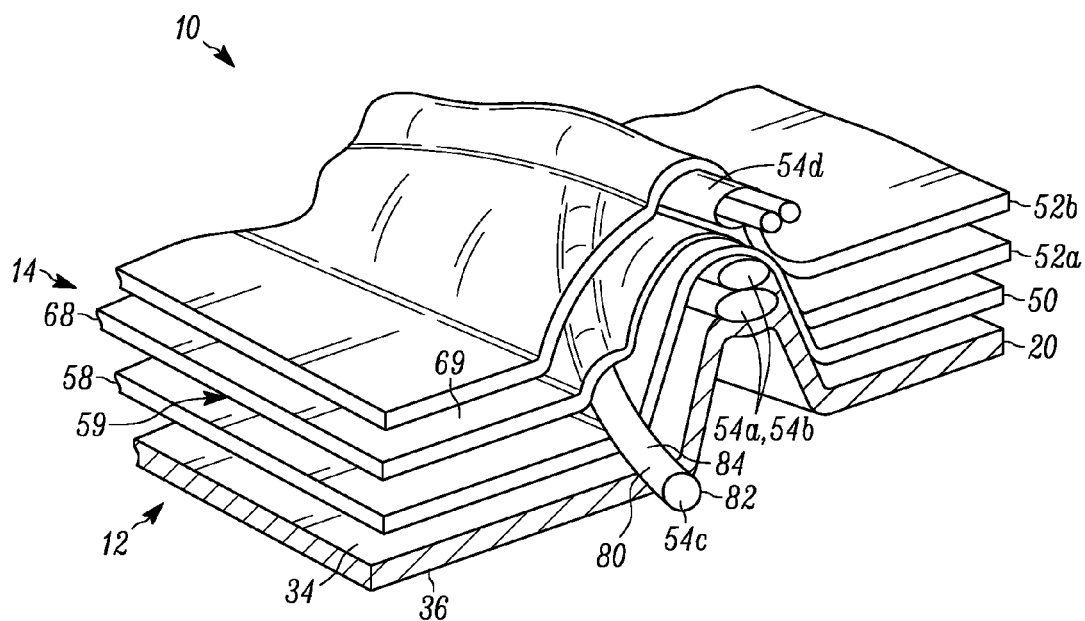
FIG. 2 of the drawings is a partial perspective cross-sectional view of one embodiment of the surgical training aid apparatus, showing, in particular, the base layer and a plurality of upper layers having body components therebetween.
Figure 3:
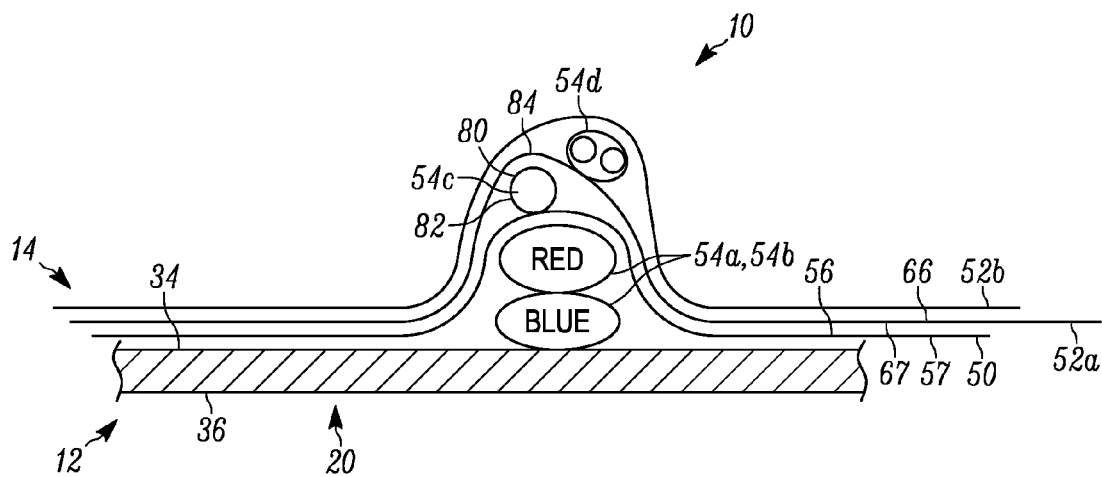
FIG. 3 of the drawings is a partial cross-sectional view of one embodiment of the surgical training aid apparatus, showing, in particular, the base layer and a plurality of upper layers having body components thereon and therebetween.
Figure 4:
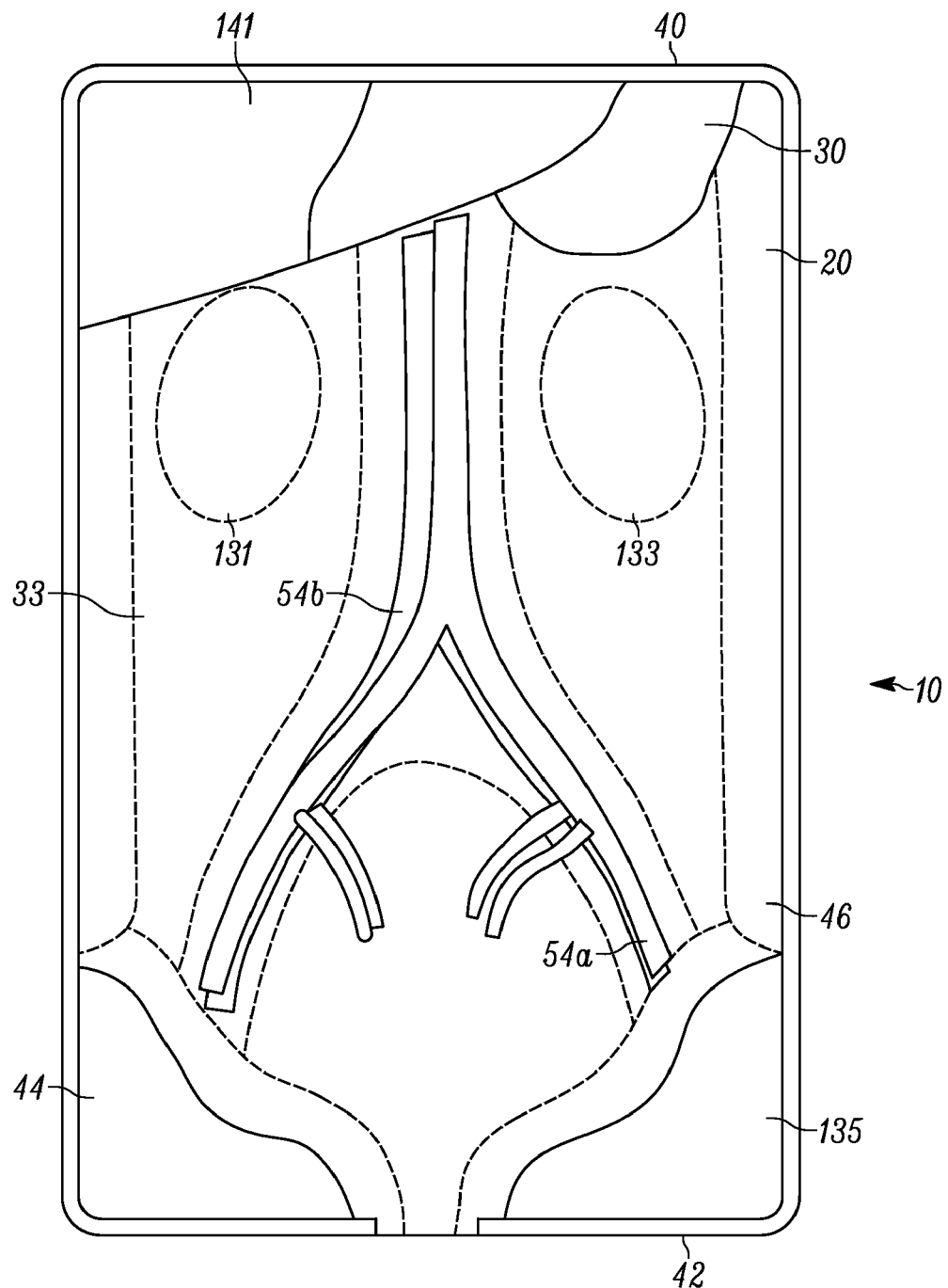
FIGS. 4 through 8 (along with the final assembled aid shown in FIG. 1) provide a step by step assembly of one embodiment of the surgical training aid apparatus of the present invention, and more specifically, FIG. 4 of the drawings is a top plan view of one embodiment of the surgical training aid apparatus of the present invention, showing, in particular, the tray along with body components positioned thereon.

More specifically, housing 10 is shown in FIGS. 2, 3 and 4, collectively, as including tray 20. Tray 20 is intended for incorporation into any one of a number of different systems, some of which utilize cameras for projecting onto screens, others of which use digital displays. In certain embodiments, the body is positioned into a larger frame structure which may mimic the contours of the outer body of a patient. In other embodiments, the tray 20 may be incorporated into a larger frame which may further include features of the body. For example, a complete torso may be provided which has the same features and principles included on tray 20, but which also imposes a life-like outer structural configuration. Certainly, such a complete torso having the features of the present invention is within the scope of the present invention.

In the embodiment shown, tray 20 includes base 30 (FIG. 4), and a raised edge assembly. With particular reference to FIG. 3, the base has a top surface 34 and a bottom surface 36. In the embodiment shown, the thickness of the base is substantially uniform, but the top and bottom surfaces 34, 36 are not planar, but have a specifically configured topography. This topography aids in the proper positioning of the anatomical replicating assembly. Moreover, certain structures, such as bones or organs which are not of particular relevance in a certain procedure, can be represented through molding certain regions of the tray. For example, the tray of FIG. 4 includes contour regions 131, 133, which, represent the kidney structure. Other contour regions are likewise shown in FIG. 4, and their representation will be understood to one of skill in the art. In other embodiments, the base of the tray may be substantially planar, or may have a planar bottom surface with varying thicknesses. Edge assembly 32 includes front edge 40, back edge 42, first side edge 44 and second side edge 46. The raised side edges along with the base collectively define cavity 33 and, in turn, the boundaries of the tray 20.

Tray 20 can be sized so as to fit within existing trainers, and so that appropriate components can be positioned thereon. In the embodiment shown, tray 20 is 17.5 inches long and 12.5 inches wide. The tray 20 comprises a pressed fiberboard material, while other materials, such as polymers, metals and composite materials are likewise contemplated. In certain embodiments, such as the embodiment of FIG. 4, a coating 135 may be applied to the upper surface of the tray 20, so as to provide a certain tackiness thereto.

With reference to FIGS. 2 and 3, anatomical replicating assembly 14 includes base layer 50, at least one upper layer, such as upper layers 52a and 52b, and at least one body component, such as body components 54a through 54d. The various structures of the anatomical replicating assembly comprise various fascia, organs, blood vessels, passageways, connecting tissue, bones, etc., found on a body of a human or another animal. While not being a limitation of the present invention, typically the anatomical replicating assembly includes organs, such as the stomach and the intestines, as well as certain key blood vessels and fluid passageways.

With collective reference to FIGS. 2 and 3, base layer 50 includes top surface 56, bottom surface 57, a thickness 58 and a surface area 59. Generally, the base layer has a substantially uniform thickness and stretches over at least a portion of the top surface 34 of the base. The base layer is secured, at least in certain portions thereof to the top surface and/or the raised edges of the tray 20. Adhesives can be used to permanently attach certain portions of the base layer to the tray, while other adhesives can be used to facilitate releasable securement. Of course, other attachment systems may be utilized, such as hook and loop fasteners, glues, adhesives, tape among others. In still other embodiments, certain portions of the bottom surface of the base layer are releasably secured to coating 135 applied to the top surface of the tray.

The top and bottom surfaces of the base layer include means for releasably adhering the top and/or bottom surface to another anatomical replicating assembly. In the embodiment shown, the releasable adhering means comprise the tackiness of the base layer 50. It has been determined that by varying the thickness of the base layer, along with modifying the constituents of the urethane formulation, the tackiness and the movement of the layer can be configured to mimic a similar structural feature (for example, the urether) of the human anatomy. The particular tackiness and adhesion required by the present invention is explained hereinbelow.

The upper layers, such as upper layer 52a, is similar to the base layer. In particular, upper layer 52a includes top surface 66, bottom surface 67, thickness 68 and surface area 69. The top and bottom surfaces include means for releasably adhering body components, and other layers thereto. Any number of upper layers are contemplated for use, depending on the particular body component that is replicated. In the embodiment shown, two upper layers, namely upper layers 52a, 52b are shown in the present embodiment, one of which represents the Toldt's fascia and the other of which represents the peritoneum. Additionally, each upper layer, as with the base layer may be varied in thickness. Furthermore, the upper layer may be formed from different materials such that the thickness, tackiness and other properties can be varied within the layer itself.

The layers define the various planes of dissection, and teach not only the placement of the various body components within the correct dissection planes, but the performance of procedures within the dissection planes, and between the dissection planes. The apparatus further teaches the interaction between the adjoining dissection planes, and how such interaction relates to the surrounding components.

The body components 54a through 54d comprise any one of a number of different structures which replicate anatomical structures found in the body. Generally, regardless of which body component is replicated, an exemplary body component 54c includes an outer surface 80 and inner region 82, along with attachment means 84. The body component may comprise a polymer material which has a desired hardness, such as, a liver, for example. The body component may comprise a tubing which may encase other tubing, such as, blood vessels, or fluid passageways, for example. The body component may comprise a substrate material such as a sock or a fabric tube which is coated with a polymer based material, to replicate, for example, a stomach, intestines or the like. Other components may comprise hard polymer members, so as to replicate bones, for example. Certain of the components may be of the type described in U.S. Pat. No. 7,018,212, entitled "Artificial Bone", and/or U.S. Pub. No. 2006/0051729 entitled "Soft Tissue Model. Each of these is incorporated by reference herein in their entirety.

Figure 9:
FIG. 9 of the drawings is a perspective view of one embodiment of the surgical training aid apparatus of the present invention, showing, in particular, the releasable attachment of the second upper layer to the first upper layer and the severing of the second upper layer.
Figure 10:
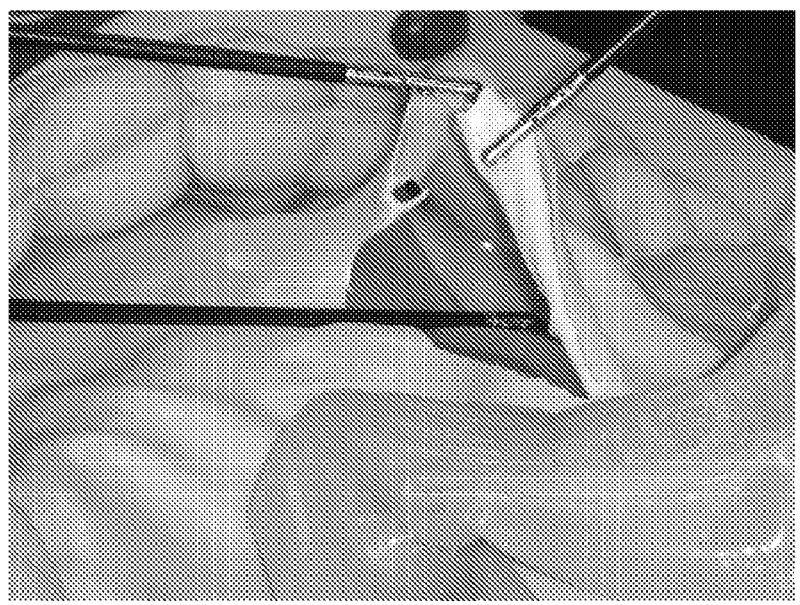
FIG. 10 of the drawings is a perspective view of one embodiment of the surgical training aid apparatus of the present invention, showing, in particular, the releasable attachment of the second upper layer to the first upper layer, the severing of the second upper layer and one of the body components, and the gripping and manipulation of the layers and the components by way of surgical tools.

Some of the body components include attachment means 84. The attachment means may comprise the tackiness of the material from which the body component is formed. Such a material may be formed from a urethane type material. In particular, the urethane material is set forth below. With reference to FIG. 9, the releasable attachment of the top surface of the first upper layer with the bottom surface of the second upper layer is shown. With reference to FIG. 10, the body components are likewise releasably attached to the layers (or to each other). In the particular embodiment, it is shown how the body component remains in an abutting attachment with the bottom surface of the second upper layer. Tools, such as those shown in FIG. 10, can be utilized to cut and separate the layers from each other.

Figure 11:
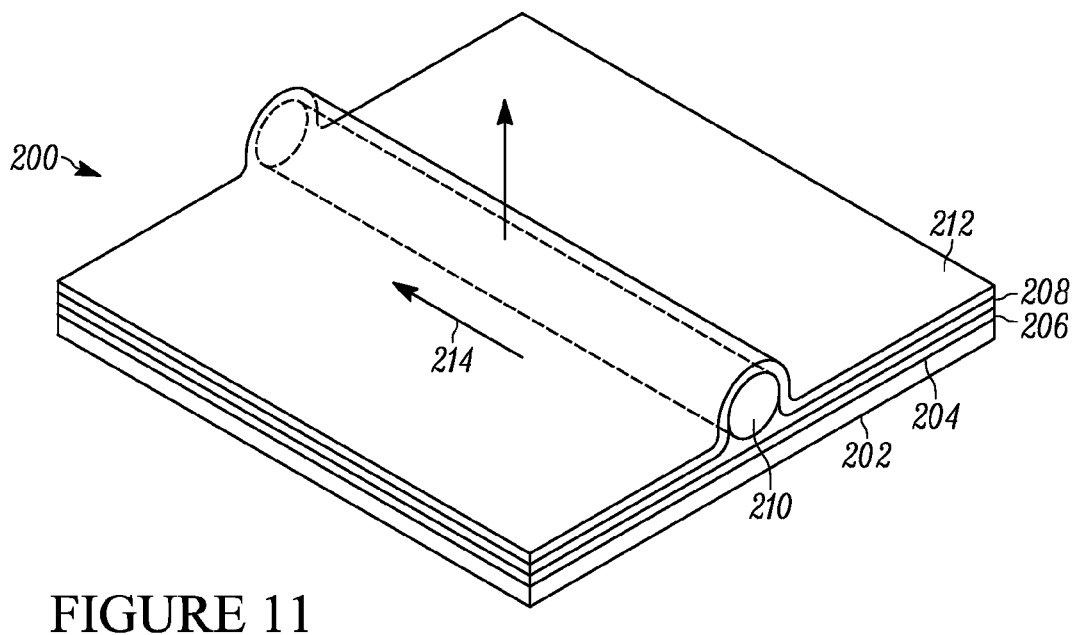
FIG. 11 of the drawings is a perspective view of a test samples of the type utilized for testing the tackiness between the layers and with a sample body component.

Certain testing was performed on samples which were made in accordance with the present invention to determine ranges of tackiness which are acceptable and suitable for use in the present invention between body component and the various layers, as well as between the respective layers. To determine such tackiness, test samples were created and tested in two different manners. With reference to FIG. 11, each specimen 200 included a base of ABS plastic 202 comprising a square material which has side lengths of six inches. Upon the ABS plastic a urethane material 204 was brushed on the surface of the ABS plastic. Next two relatively thin layers of urethane 206, 208 were placed upon the brushed urethane. Next, a ⅜" diameter cylindrical body component 210 formed from urethane was placed so that it extended from side to side of the ABS plastic. Finally, a relatively thick layer of urethane 212 was positioned over the cylindrical. Before assembly, each of the components was cleaned with isopropyl alcohol. Each component was weighed. The weight results are shown below for the various different samples. In total 10 samples were formed, each having identical configurations except that the second five samples had a slightly different formulation for the brushed urethane than the first five samples.

Figure 12:
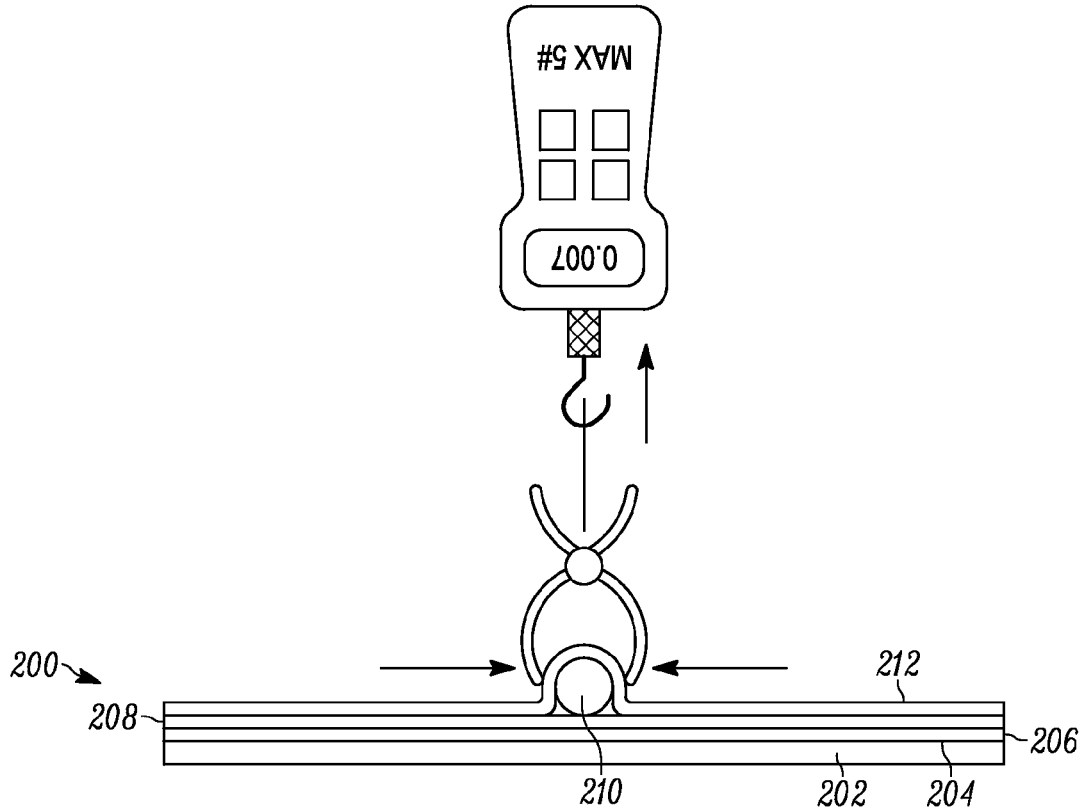
FIG. 12 of the drawings is a side elevational schematic view of the first testing configuration utilized with the samples of FIG. 11.

Two tests were undertaken. With reference to FIG. 12, the first test involved the clamping of the body component on opposing sides followed by an upward force until the body component was vertically displaced a distance of three centimeters. The force required to achieve such displacement was recorded. The test results are shown in the table below and referred to as the "pull force".

Figure 13:
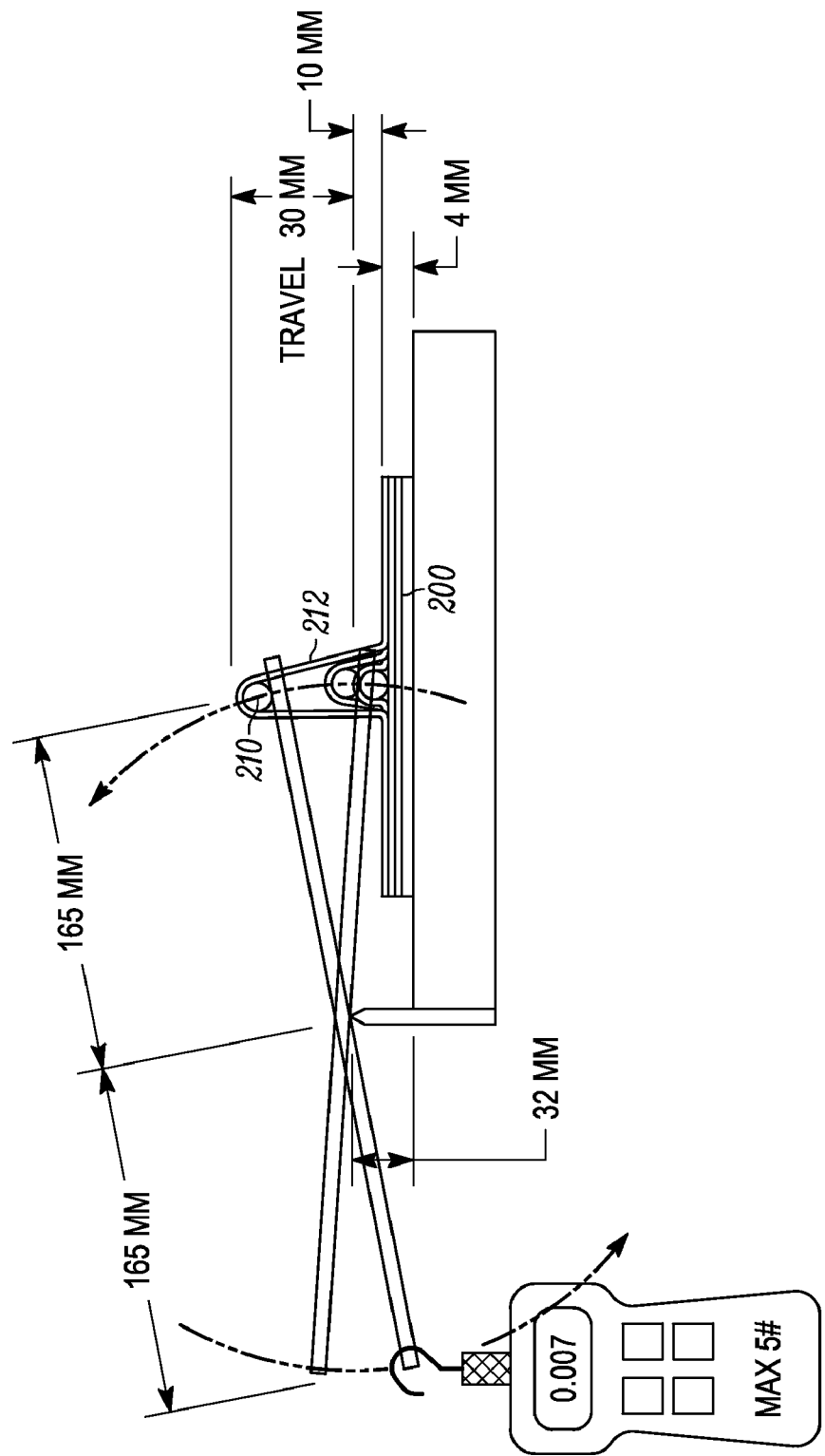
FIG. 13 of the drawings is a side elevational schematic view of the second testing configuration utilized with the samples of FIG. 11.

With reference to FIG. 13, the second test was performed by first making incision 214 through the third layer of urethane proximate and along the interface with the body component (FIG. 11). A lever was then slid into the cut and below the body component. While securing the base of the sample, a force was exerted on the opposing side of the lever until the body component spread apart from the underlying second layer of urethane. The lever was a total of 330 mm long, the fulcrum was 32 mm above the table upon which the specimen was laid. The lever extended beyond the body component a distance of 15 mm. The force required to vertically separate the body component corresponding to a displacement of the end of the lever arm a distance of three centimeters was recorded. It is shown in the table below and referred to as the "spread force."

can be replicated. Additionally, the sample system is provided for exemplary purposes and is not intended to limit the invention to the particular system or body portion that is replicated. For example, one particular embodiment is shown in sequentially in FIGS. 4 through 8 and FIG. 1. The abdominal tray can be utilized to practice several different procedures, including, but not limited to left hemi-colectomy, right hemi-colectomy and appendectomy.

The particular abdominal tray will be discussed with the understanding that it is exemplary only and not intended to be limiting. Specifically, the underlying tray 20 is provided. The tray may be painted or otherwise coated with a material, depending on the application. As can be seen in FIG. 4, the tray includes a number of surface variations so as to mimic anatomical features of the human body. Next, a body member, such as the liver 141, in this embodiment, is coupled to the top surface of the base.

Subsequently, and with further reference to FIG. 4, a body component, in the form of the common iliac artery 54a and iliac vein 54b are positioned longitudinally along the top surface of the tray. In the embodiment shown, the iliac vein is molded such that it appears bluish; the iliac artery is molded such that it appears red. The two arteries include attachment means so as to adhere, releasably to the coating of the tray and to each other (as well as to other layers).

Figure 5:
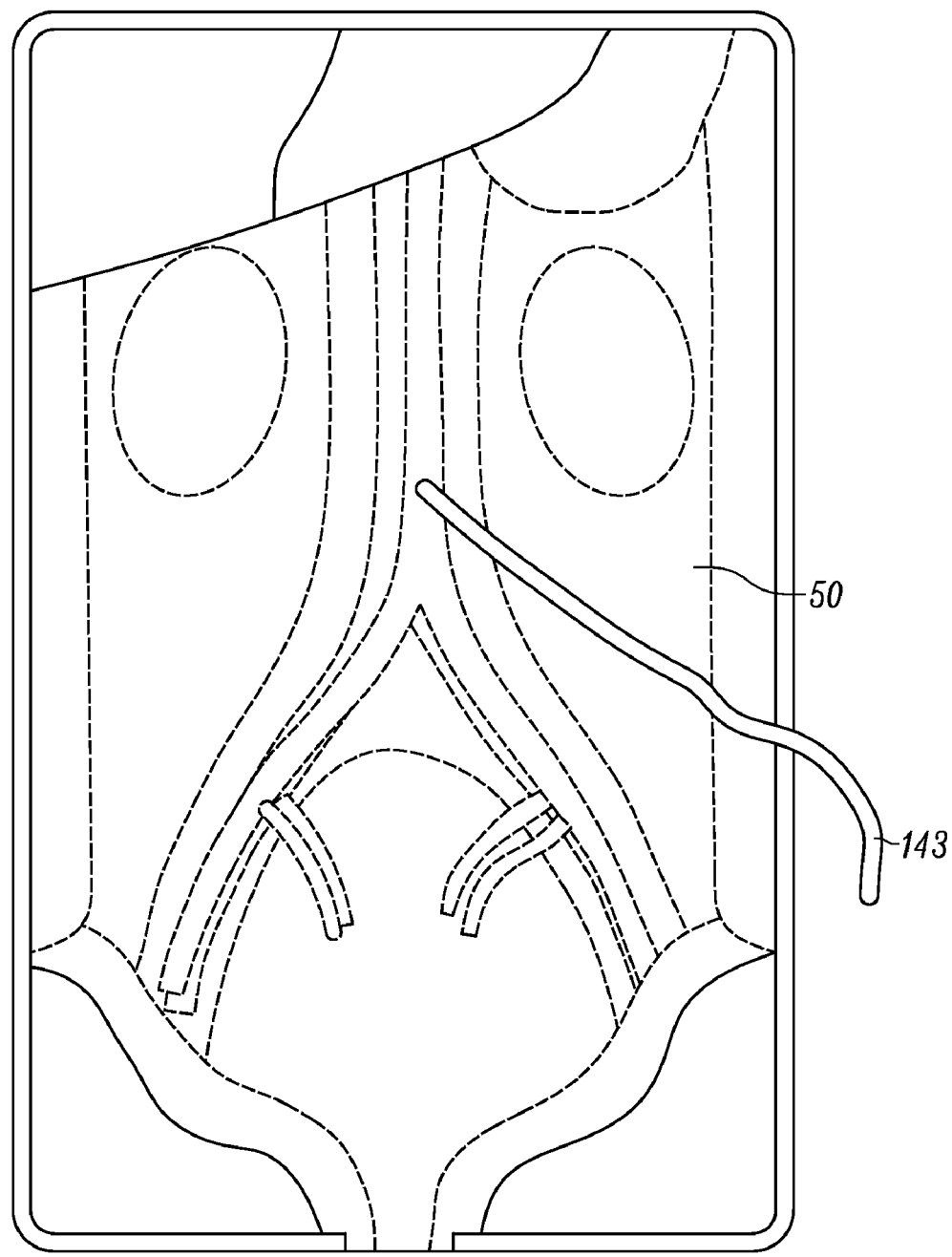

With reference to FIG. 5, the base layer 50 is positioned over the top surface of the base of the tray and over the iliac artery and vein. An additional body component, in the form of artery 143 is positioned over the base layer 50 and, then through the base layer so as to connect to the iliac artery. The bottom surface of the base layer has a tackiness such that it adheres with a predetermined force against the top surface of the base of the tray, and to portions of the iliac artery and/or

| Sample Number | Thin Layer 1 | Thin Layer 2 | 3/8" Dia. X 6" long Vessel | Thick Layer 3 | Pull Force (pounds) height 3 cm | Spread Force (pounds) height 3 cm | Comments |
|---|---|---|---|---|---|---|---|
| 1 | .670 oz | .750 oz | .350 oz | 1.250 oz | 5.60 | 3.00 | Isopropyl alcohol cleaned |
| 2 | .670 oz | .750 oz | .350 oz | 1.250 oz | 5.15 | 3.01 | Isopropyl alcohol cleaned |
| 3 | .670 oz | .750 oz | .350 oz | 1.250 oz | 5.20 | 2.60 | Isopropyl alcohol cleaned |
| 4 | .670 oz | .750 oz | .350 oz | 1.250 oz | 5.15 | 2.80 | Isopropyl alcohol cleaned |
| 5 | .670 oz | .750 oz | .350 oz | 1.250 oz | 5.35 | 2.90 | Isopropyl alcohol cleaned |
| 6 | .670 oz | .750 oz | .350 oz | 1.250 oz | 5.30 | 3.25 | Isopropyl alcohol cleaned |
| 7 | .670 oz | .750 oz | .350 oz | 1.250 oz | 5.05 | 3.10 | Isopropyl alcohol cleaned |
| 8 | .670 oz | .750 oz | .350 oz | 1.250 oz | 5.10 | 2.85 | Isopropyl alcohol cleaned |
| 9 | .670 oz | .750 oz | .350 oz | 1.250 oz | 5.10 | 2.60 | Isopropyl alcohol cleaned |
| 10 | .670 oz | .750 oz | .350 oz | 1.250 oz | 5.20 | 2.80 | Isopropyl alcohol cleaned |

From these tests it was determined that urethane materials which have results of between 4.3 and 5.5 pounds in the pull force test and has results between 2.2 and 3.75 pounds in the spread force test will exhibit the required tackiness between the various layers and/or between the layers and the body components.

One sample system will be described, with the understanding that any number of different body portions or sub-portions vein. Similarly, the top surface of the base layer has tackiness which facilitates adherence of additional layers which are positioned thereon.

Figure 6:
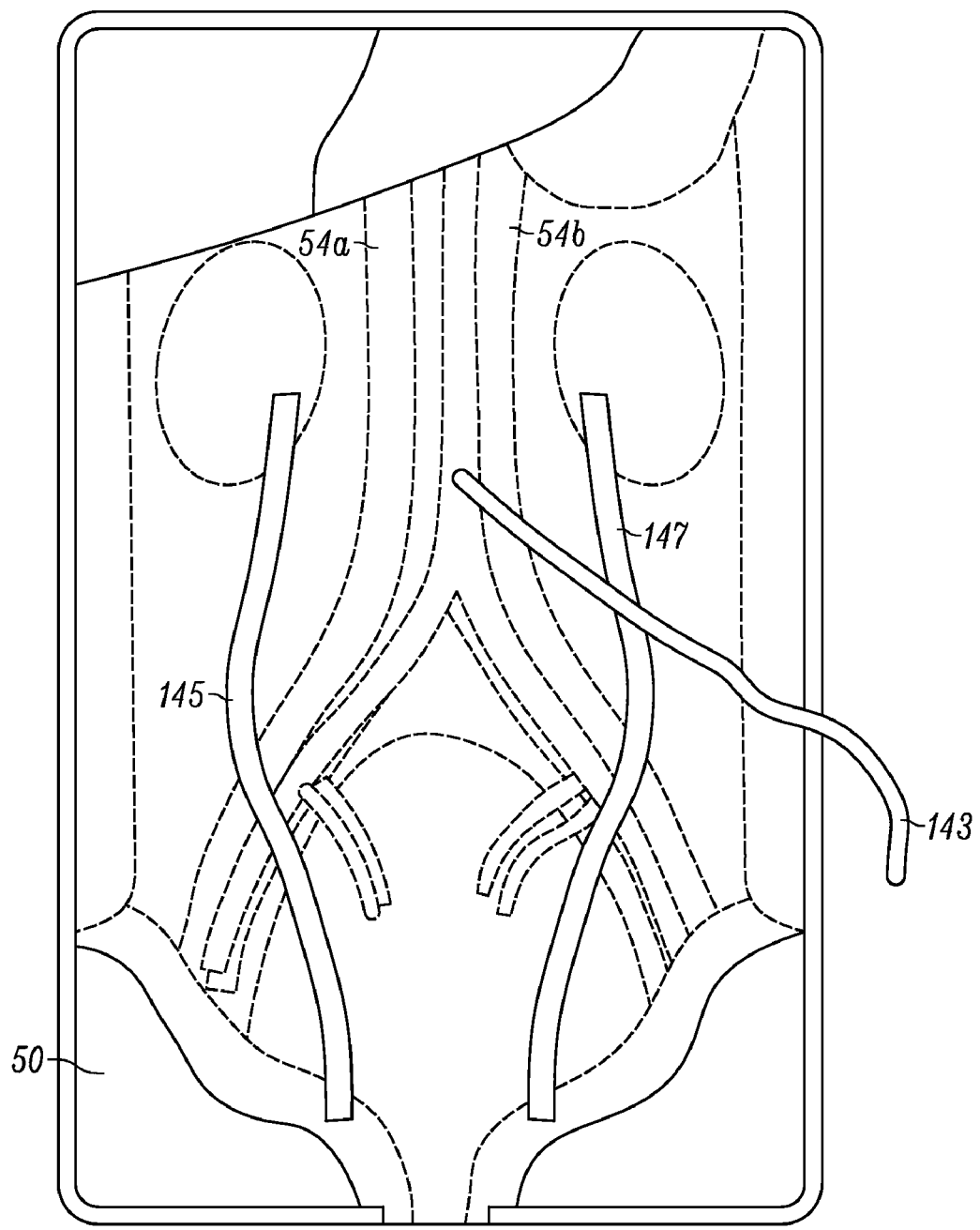

Next, and with reference to FIG. 6, ureters 145 and 147 are positioned such that a majority of each is placed on the top surface of the base layer 50, with each end extending through the base layer 50, the first terminating proximate surface variations which mimic kidneys, and the second terminating proximate the back edge of the tray. The ureters likewise include an attachment means so as to releasably couple to the abutting components.

Figure 7:
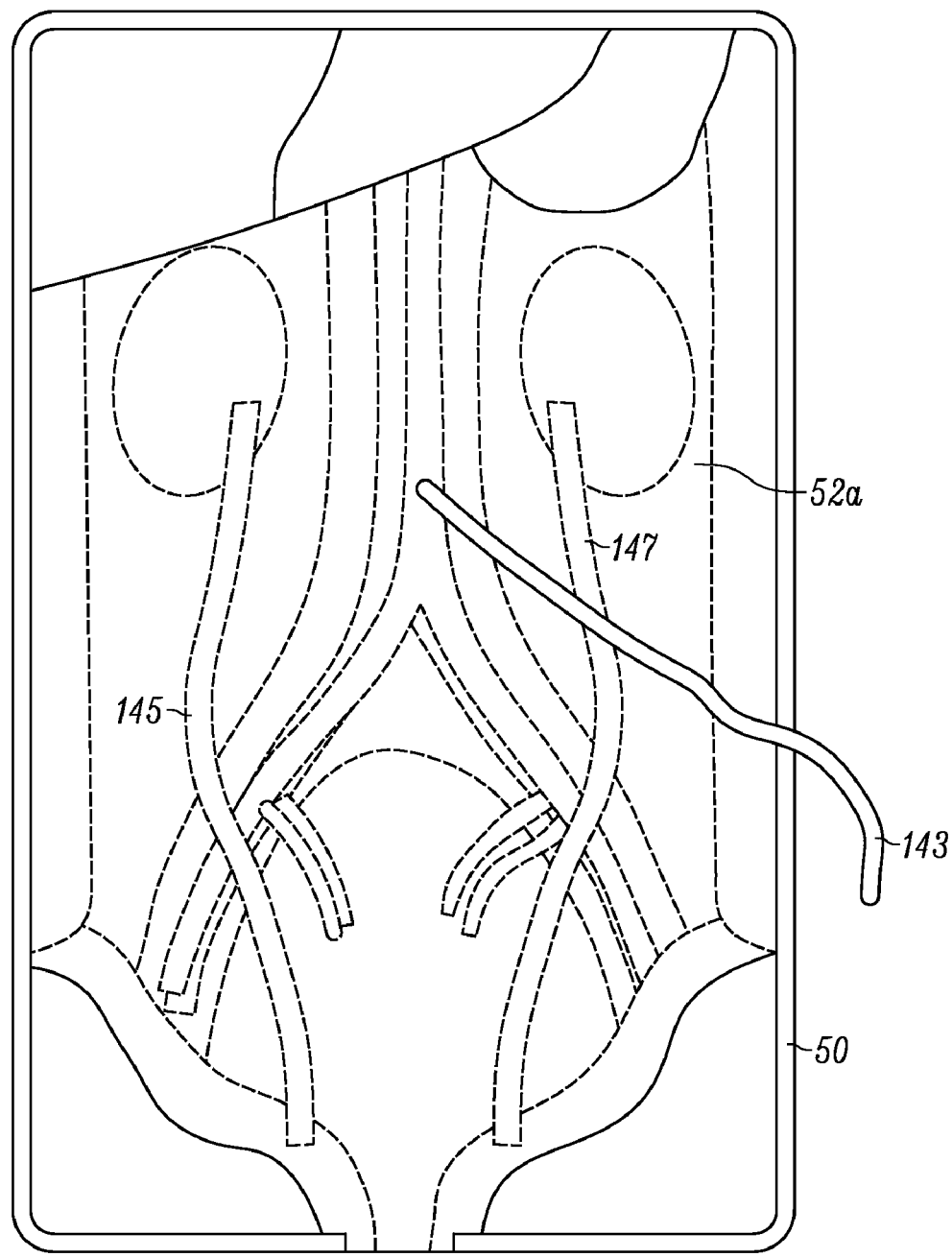

Once completed, and with reference to FIG. 7, the ureters are positioned and threaded through the base layer 50. The first upper layer 52a, replicating the toldt's fascia, is positioned over the ureters 145 and 147 and over the base layer 50. The artery is threaded through an opening of the first upper layer. The first upper layer 52a includes a tackiness which releasably adheres to the top surface of the base layer. In the embodiment shown, both the top surface of the base layer and the bottom surface of the first upper layer include a tackiness. It is envisioned that only one of these layers, or portions of these layers include a tackiness as required to couple, releasably, and at a predetermined rate from other adjoining components.

Figure 8:
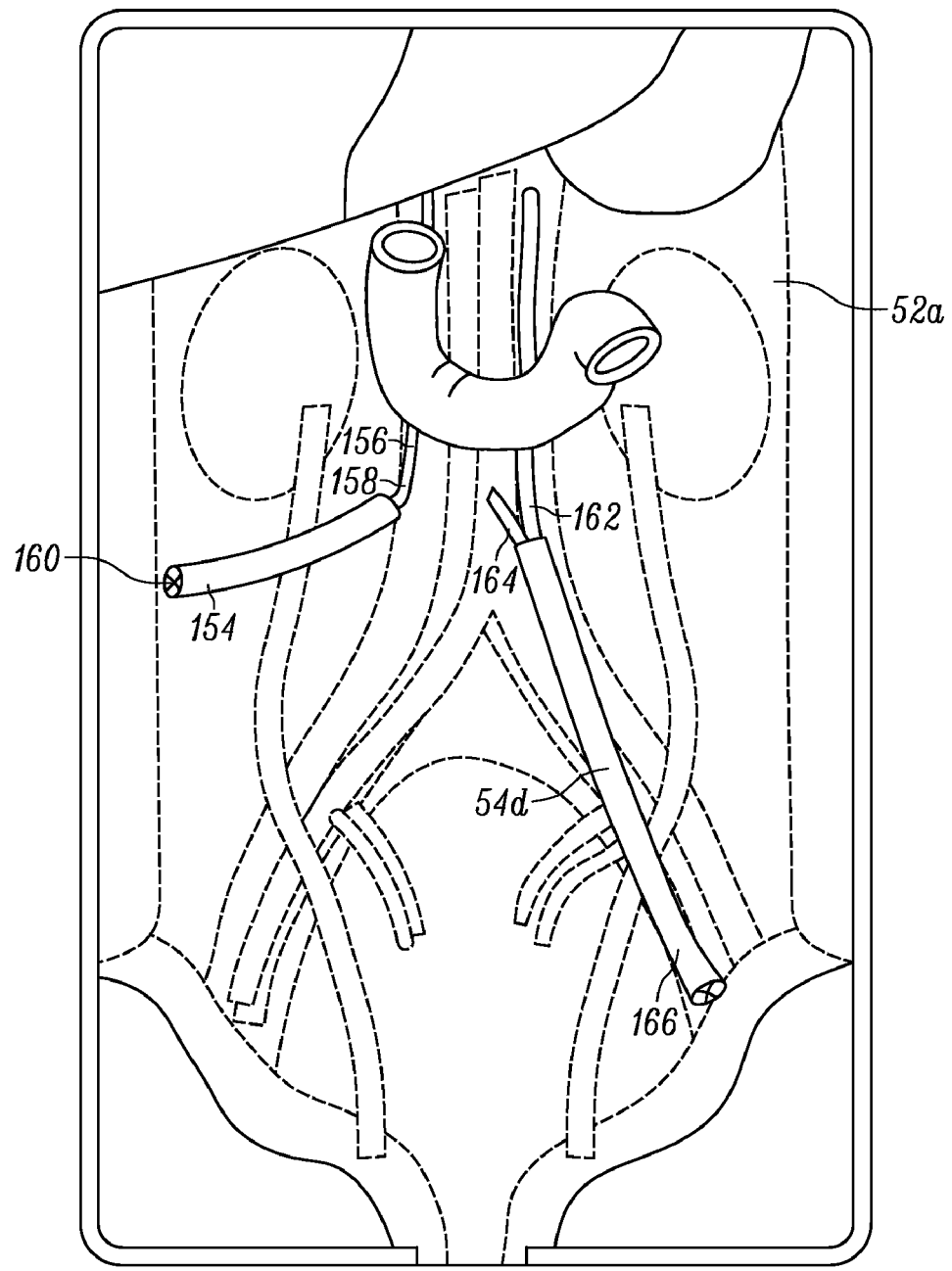

With reference to FIG. 8, once the first upper layer 52a is positioned, the sigmoid vessel assembly 154 and the right colic vessel assembly 54d is positioned as desired. Specifically, the sigmoid vessel assembly 54d includes inferior mesenteric artery 162, inferior mesenteric vein 164 and membrane sleeve 166. In the embodiment shown, the membrane sleeve 166 is placed over a portion of the inferior mesenteric artery and vein 162 and 164, respectively. The inferior mesenteric artery is red in color, the inferior mesenteric vein is blue in color and the membrane sleeve is white in color. These body components likewise include a tackiness, and in particular, the sleeve member, which with the cooperation of the tackiness of the top surface of the first upper layer serves to releasably maintain the members in a releasably attached configuration.

The right colic vessel assembly 154 includes superior mesenteric artery 156, superior mesenteric vein 158 and membrane sleeve 160. The membrane sleeve 160 is positioned over a portion of the superior mesenteric artery 156 and the superior mesenteric vein 158. The superior mesenteric artery is red in color, the superior mesenteric vein is blue in color and the membrane is white in color. As with the sigmoid vessel assembly, the right colic vessel assembly includes a tackiness which cooperates with the tackiness of the upper surface of the first upper layer 52a so as to releasably retain the right colic vessel assembly and the first upper layer 52 in cooperative engagement.

Next, and with reference to FIG. 1, the second upper layer, termed the peritoneum, is positioned over the assembly. The bottom surface of the second upper layer includes a tackiness. As such, this tackiness cooperates with the tackiness of the abutting components, including the components shown in FIG. 8, namely, first upper layer 52a, the sigmoid vessel assembly 54d and the right colic vessel assembly 154.

In the present embodiment, the second upper layer 52b is substantially yellow in color, and opaque, whereas the base layer 50 and the first upper layer 52a are substantially clear/translucent in color. Additionally, while not required, the second upper layer 52b is thicker than the base layer 50 and the first upper layer 52a.

Additional body components are subsequently positioned upon the top surface of the second upper layer 52b. Specifically, stomach 163 is coupled to the upper surface of the second upper layer 52b. In the embodiment shown, an adhesive or other bonding material is utilized so as to substantially permanently bond the stomach to the top surface of the second upper layer. Similarly, the duodenum (not shown), spleen 165, appendix 167 and colon with rectum 169 are provided. The spleen is coupled to one of the stomach and the second upper layer. The stomach and the spleen comprise a relatively rigid member, as for the intended use of the particular embodiment, these features are utilized for placement and location, but they are generally remote from the areas that are to be cut and manipulated.

The colon is positioned and adhered to the second upper layer 52b, so as to substantially permanently bond the two structures together, as these structures are generally bonded to each other quite strongly in the body of a human. Finally, the appendix is adhered to the colon in the desired orientation. In the embodiment shown, the colon comprises a generally hollow body member (formed from a fabric or the like) which is coated with a polymer (such as a urethane). The appendix comprises a molded polymer member.

It will be understood that the foregoing comprises one of any number of different anatomically accurate training apparatuses that can be prepared, and one of skill in the art would be able to determine others. Additionally, the anatomical training apparatus shown may be modified to include abnormal elements (such as tumors or other abnormalities) to further train doctors relative to the performing of medical procedures.

In operation, the doctor in training can cut the various layers as needed, as well as the various body components. Advantageously, as the body components and the various layers are releasably secured to each other by way of the tackiness of the material itself, the user is taught to separate the layers and to separate the components much like the manner in which such layers are separated in the body during a surgery. Furthermore, the doctor in training can learn to operate within the body within or between the various layers and learn the relative adhesion of the various components relative to each other.

For example, and with reference to FIG. 9, initially, the second upper layer can be severed by scissors or other instrument. Furthermore, the layers can be separated by manual manipulation, as well as with tools. As is shown, the top surface of the first upper layer is releasably attached to the bottom surface of the second upper layer. Furthermore, other manipulation of the various structures is facilitated. In particular, with reference to FIG. 10, the second upper layer has been cut. Furthermore, a body member (in the form of blood vessels) is likewise severed. Other tools are utilized to grasp and manipulate the second upper layer. An additional tool is utilized to separate the first and second layers. It will be understood that the materials are such that suturing is likewise facilitated.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A surgical training aid apparatus for facilitating the training of medical procedures comprising:
   a housing having a tray, the tray including a bottom surface and a top surface opposite the bottom surface; and
   an anatomical replicating assembly positioned upon the top surface of the tray of the housing, the anatomical replicating assembly comprising:
   a base layer having a bottom surface and a top surface, the base layer overlying a portion of the top surface of the tray of the housing, at least a portion of at least one of the top surface and bottom surface including a tackiness;
   at least one body component positioned at least one of between the top surface of the housing and the bottom surface of the base layer and on the base layer, the at least one body component including a tackiness,
wherein the at least one body component is releasably coupled to the base layer due to the tackiness of the two components, wherein the tackiness is overcome so as to separate the at least one body component to the base layer.

2. The surgical training aid apparatus of claim 1, further comprising:
at least one upper layer having a bottom surface and a top surface, the at least one upper layer being coextensive with at least a portion of the base layer, the at least one upper layer including a tackiness on at least one of the top surface and bottom surface;
wherein the at least one body component further includes a further body component which is positioned between the base layer and the at least one upper layer, the further body component including a tackiness.

3. The surgical training aid apparatus of claim 2, wherein the at least one upper layer further comprises a plurality of upper layers, at least one further body component positioned at least one of between the first upper layer and second upper layer and on the second upper layer.

4. The surgical training aid apparatus of claim 3, wherein the base layer replicates a fascia, at least one of the plurality of upper layers comprises a toldt's fascia and at least one of the plurality of upper layers comprises a peritoneum.

5. The surgical training aid apparatus of claim 3, wherein the at least one body component comprises a plurality of body components, wherein the plurality of body components comprise a colon with rectum positioned upon the second upper layer, a sigmoid vessel assembly and a right colic vessel assembly positioned between the first upper layer and the second upper layer, at least one ureters positioned between the base layer and the first upper layer, and at least one artery and at least one vein positioned between the upper surface of the tray and the base layer.

6. The surgical training aid apparatus of claim 1 wherein the tackiness of the base layer and the at least one body component comprises the natural tackiness of the material.

7. The surgical training aid apparatus of claim 6 wherein the base layer and the at least one body component comprise a urethane material.

8. The surgical training aid apparatus of claim 1 wherein the tackiness of the base layer and the at least one body component are of a different strength.

9. The surgical training aid apparatus of claim 1 wherein at least one of the at least one components is adhered to at least one of the tray and the base layer.

10. The surgical training aid apparatus of claim 1 wherein the top surface of the tray includes contours to replicate at least one body component.

11. A surgical training aid apparatus for facilitating the training of medical procedures comprising:
a housing having a tray, the tray including a bottom surface and a top surface opposite the bottom surface; and
an anatomical replicating assembly positioned upon the top surface of the tray of the housing, the anatomical replicating assembly comprising:
a base layer having a bottom surface and a top surface, the base layer overlying a portion of the top surface of the tray of the housing, at least a portion of at least one of the top surface and bottom surface including a tackiness;
at least one upper layer having a bottom surface and a top surface, the base layer overlying a portion of the top surface of the base layer, at least a portion of at least one of the top surface and the bottom surface including a tackiness;
a plurality of body components, at least one of the plurality of body components positioned between the tray and the base layer, at least one of the plurality of body components positioned between the base layer and the at least one upper layer, at least one of the plurality of body components positioned upon the at least one upper layer, wherein at least some of the plurality of body components are coupled to an adjoining layer by way of the tackiness thereof.

12. The surgical training aid apparatus of claim 11 wherein the at least one upper layer comprises a plurality of upper layers.

13. The surgical training aid apparatus of claim 12 wherein the tray includes a tackiness.

14. The surgical training aid apparatus of claim 11 wherein the top surface of the tray further comprises a plurality of contour regions which mimic various anatomical features of a body.

15. The surgical training aid apparatus of claim 11 wherein at least one of the plurality of body components is adhered to at least one of the tray, the base layer and the at least one upper layer, so as to be substantially permanently attached thereto.

16. The surgical training aid apparatus of claim 15 wherein each of the base layer and the at least one upper layer comprise a urethane material having a natural tackiness.

17. The surgical training apparatus of claim 16 wherein at least one of the plurality of body components comprises a urethane material having a natural tackiness.

18. A surgical training aid apparatus comprising:
a base;
a plurality of layers defining a plurality of dissection planes;
at least one body component positioned at least one of between and on one of the plurality of layers defining a plurality of dissection planes,
wherein at least one of the plurality of layers and the at least one body component includes a tackiness which releasably attaches the at least one body component and at least one of the plurality of layers together.

19. The surgical training aid of claim 18 wherein the base includes a tray having a top surface which includes a tackiness.

* * * * *